US010396546B2

(12) United States Patent
Dueser (10) Patent No.: US 10,396,546 B2
(45) Date of Patent: Aug. 27, 2019

(54) RESIDUAL CURRENT PROTECTION DEVICE

(71) Applicant: Airbus Operations, GmbH, Hamburg (DE)

(72) Inventor: Gerd Dueser, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 221 days.

(21) Appl. No.: 14/986,709

(22) Filed: Jan. 3, 2016

(65) Prior Publication Data
US 2016/0197466 A1 Jul. 7, 2016

(30) Foreign Application Priority Data
Jan. 2, 2015 (DE) .................. 10 2015 200 008

(51) Int. Cl.
*H02H 3/08* (2006.01)
*H02H 3/33* (2006.01)

(52) U.S. Cl.
CPC .................... *H02H 3/33* (2013.01)

(58) Field of Classification Search
CPC .......... H02H 3/33; H02H 3/006; H02H 3/087; H02H 3/08; H02H 9/02; H02H 3/00;
(Continued)

(56) References Cited

U.S. PATENT DOCUMENTS 5,835,322 A * 11/1998 Smith ............... H02H 3/33
361/45

6,583,975 B2 * 6/2003 Bax .................. H02H 3/347
361/115
(Continued)

FOREIGN PATENT DOCUMENTS

DE 19944409 2/2001
DE 19944409 A1 * 2/2001 ............. H02H 3/334
(Continued)

OTHER PUBLICATIONS

(Scneider Electric [online]. hpi.co,ir [retrieved on Oct. 24, 2012]. Retrieved from the Internet: <URL: http://hpi.co.ir/productcatalog/9020060020031.pdf>.*
(Continued)

*Primary Examiner* — Thienvu V Tran
*Assistant Examiner* — Nicolas Bellido
(74) *Attorney, Agent, or Firm* — Greer, Burns & Crain, Ltd.

(57) ABSTRACT

A residual current protective device for an electric circuit having at least one electrical consumer comprises a residual current determination component, a leakage current determination component and an interruption component. The residual current determination component is configured to determine an amperage difference between the amperage of a current flowing to the at least one electrical consumer and the amperage of a current flowing from the at least one electrical consumer. The leakage current determination component is configured to determine the amperage of a leakage current flowing out of the electric circuit to earth (ground). The interruption component is configured to interrupt the electric circuit if the difference between the determined amperage difference and the determined amperage of the leakage current exceeds a preset limit value.

13 Claims, 6 Drawing Sheets

(58) Field of Classification Search
CPC ...... H02H 3/16; H02H 5/047; H03K 17/0822; H02M 1/32; H01C 7/13; G01R 31/00; G01R 31/025; G01R 11/04; G01R 15/125; G01R 15/18; G01R 15/20; G01R 19/00; G01R 19/0092; G01R 19/02; G01R 19/10; G01R 19/145; G01R 19/165; G01R 19/16528; G01R 19/16547; G01R 19/2506; G01R 19/2509; G01R 19/2513; G01R 21/06; G01R 21/08; G01R 21/133; G01R 22/063; G01R 23/02; G01R 27/025; G01R 27/18; G01R 31/005; G01R 31/006; G01R 31/024; G01R 31/041; G01R 31/045; G01R 31/1272; G01R 31/3274; G01R 31/3277; G01R 31/3333; G01R 31/34; G01R 31/371; G01R 31/42; G01R 33/0206; G01R 35/00; G01R 35/005; H01H 71/00; H02J 1/00; H02J 1/102; H02J 1/12; H02J 13/00; H02J 13/0003; H02J 13/0006; H02J 13/0013; H02J 13/0017; H02J 13/0062; H02J 13/0089; H02J 13/0096; H02J 15/00; H02J 2001/008; H02J 2003/001; H02J 2003/003; H02J 2003/143; H02J 2003/146; H02J 2007/0001; H02J 2007/0067; H02J 2007/0096; H02J 3/00; H02J 3/006; H02J 3/06; H02J 3/14; H02J 3/1814; H02J 3/1878; H02J 3/26; H02J 3/32; H02J 3/36; H02J 3/381; H02J 3/382; H02J 3/383; H02J 3/385; H02J 3/386; H02J 3/387; H02J 3/40; H02J 3/46; H02J 4/00; H02J 7/0013; H02J 7/0016; H02J 7/0026; H02J 7/0027; H02J 7/0029; H02J 7/0031; H02J 7/0042; H02J 7/0044; H02J 7/0045; H02J 7/0063; H02J 7/0068; H02J 7/007; H02J 7/045; H02J 7/34; H02J 7/35; H02J 7/355; H02J 9/02; H02J 9/062; H02J 9/08; H05B 33/0872
USPC .. 361/91.1, 93.1, 88, 87, 86, 78, 49, 46, 45, 361/43, 42, 18, 115, 102
See application file for complete search history.

(56) References Cited

U.S. PATENT DOCUMENTS

| | | | | |
|---|---|---|---|---|
| 8,009,394 | B2* | 8/2011 | Atoji | G01R 31/025 361/44 |
| 8,472,154 | B2* | 6/2013 | Rivers, Jr. | H02J 3/1828 361/30 |
| 8,749,928 | B2* | 6/2014 | Fink | H02H 3/33 361/42 |
| 2001/0029433 | A1* | 10/2001 | Scott | G01R 31/025 702/58 |
| 2005/0083617 | A1 | 4/2005 | Blumenauer et al. | |
| 2008/0180195 | A1* | 7/2008 | Nakano | H01H 71/0207 335/7 |
| 2008/0258563 | A1* | 10/2008 | Hodges | H01R 13/7038 307/112 |
| 2014/0312877 | A1* | 10/2014 | Kammer | G01R 19/10 324/76.11 |
| 2016/0134105 | A1* | 5/2016 | Harris | H02H 3/14 361/91.1 |
| 2016/0301201 | A1* | 10/2016 | Hahn | H02H 3/083 |

FOREIGN PATENT DOCUMENTS

| | | | | |
|---|---|---|---|---|
| DE | 19944409 A1 * | 2/2001 | | H02H 3/334 |
| DE | 10125529 | 12/2011 | | |
| DE | 102012200660 | 5/2013 | | |

OTHER PUBLICATIONS (Scneider Electric [online]. hpi.co,ir [retrieved on Oct. 24, 2012]. Retrieved from the Internet: <URL:http://hpi.co.ir/productcatalog/9020060020031.pdf>. (Year: 2012).*
German Search Report, dated Oct. 23, 2015, priority application.

* cited by examiner

RESIDUAL CURRENT PROTECTION DEVICE

CROSS-REFERENCES TO RELATED APPLICATIONS

This application claims the benefit of German patent application No. 10 2015 200 008.7 filed on Jan. 2, 2015, the entire disclosures of which are incorporated herein by way of reference.

BACKGROUND OF THE INVENTION

The present disclosure relates generally to protection against residual currents. In particular, the present disclosure relates to a residual current protective device for an electric circuit with at least one electrical consumer, an electric circuit with at least one such residual current protective device, an aircraft element or an aircraft assembly comprising at least one such residual current protective device and/or at least one such electric circuit, an aircraft comprising at least one such residual current protective device and/or at least one such electric circuit, the use of the residual current protective device on board an aircraft and a method for residual current protection.

In electric circuits with electrical consumers, residual currents can occur for various reasons, which currents flow out of the electric circuit to earth (ground). For example, hazards may arise for persons when touching live parts of electrical systems. Furthermore, residual currents can ignite insulation, even as very small currents. Machinery can also be damaged by a leakage short occurring, for example. The aforementioned examples can be summarized under the terms personal protection, fire protection and machinery protection. To avoid such consequences, various protective devices have been used successfully for years.

An important protective device for the power grid is realized by the so-called residual current circuit breaker. Residual current circuit breakers, also commonly known as "RCCBs," are the most frequently used devices from the higher-level group of "residual current devices" (RCD). Residual current devices of any type prevent dangerously high residual currents to earth and thus contribute significantly to reducing life-threatening electrical accidents in low-voltage networks.

Residual current protective devices protect against the continued existence—not the emergence—of an excessively high touch current. For personal protection they are an efficient means of avoiding dangerous electrical accidents, in particular earth leakages via the body. Such protective devices typically disconnect the circuit from an operating current (also termed tripping current) of 10 mA or 30 mA, for example. Another very substantial aspect for the use of residual current protective devices is fire protection. For technical fire safety reasons, protective devices, alarm or monitoring apparatus with a rated residual current/operating current of, e.g., 300 mA are used. The aforementioned machinery protection can also be achieved with the aid of residual current protective devices. Residual current protective devices with an operating current of 500 mA or more, for example, are used for machinery protection.

In addition to the aforementioned residual currents, so-called leakage currents (often also termed stray currents) can occur for various reasons in electric circuits with electrical consumers. A current can be described as a stray current if it basically flows normally to the earthing (grounding) or equipotential bonding system or to a protective earth conductor of an electrical installation via current paths not belonging to the operating circuit. The current paths not belonging to the operating circuit can be current paths that have been deliberately provided, for example, or undesirably occurring current paths. A capacitive filter at inputs and/or outputs of the connected electrical consumers (equipment), such as, e.g., EMC filters, can be cited as an example of a deliberately provided current path. In many spheres, such as, e.g., on board aircraft, electrical appliances are often installed with a very high density, so that high-frequency interferences can affect neighboring appliances in spite of the short distances between the appliances. Electrical fault currents can be discharged to the aircraft earth with the help of these filters. Examples that can be cited as undesirably occurring current paths are parasitic leakage capacitances of cables and lines or parasitic leakage capacitances in connected electrical equipment.

A residual current circuit breaker disconnects the monitored circuit from the rest of the power grid as soon as current flows on an unpermitted or inexplicable path. To do this, the residual current circuit breaker compares the level of the current flowing out with that of the returning current. In an intact system, the sign-dependent sum of all currents flowing through the residual current circuit breaker must be zero. Expressed in another way, the current to the consumer must be as great as the current flowing back from the consumer. Residual currents can occur, however, if a (residual) current flows through the human body or via defective insulation, for instance. As soon as a partial current is discharged to earth anywhere in the circuit, the sum of the outward and returning current in the summation current transformer of the residual current circuit breaker is no longer zero. A current difference occurs, which leads to tripping of the residual current circuit breaker and thus to the complete disconnection of the circuit. The comparison takes place in a summation current transformer. This has two or more cable cores (primary windings) running through it. They are routed so that their induction effect is normally mutually cancelled out, no magnetic flux is induced in the transformer core and no secondary current flows. The transformer thus "adds" all currents flowing to and from the consumer with sign. If a partial current flows to earth from one core (residual current), then the sum of outward and returning currents in the transformer is no longer zero. This results in a current in the secondary winding (trip coil). The secondary current triggers a relay (switching lock), which disconnects all poles of the cable.

This means that if a certain residual current is exceeded, usually 30 mA in household systems and public buildings, known residual current circuit breakers disconnect all poles of the monitored circuit, meaning all conductors up to the protective earth conductor, from the rest of the grid. If the returning current is reduced solely on account of a leakage current (e.g., due to defective insulation or to a capacitive filter arranged in the circuit) by 30 mA, for example, the circuit breaker trips, although no hazardous situation might exist.

It is true that conventional residual current protective devices guarantee reliable tripping in the case of a hazardous residual current. On the other hand, as outlined above by way of example, it can occur that the protective devices trip although no hazardous residual current exists. Excessively frequent, unnecessary disconnection of the circuit can lead to a reduction in the operational availability of electrical systems.

It is desirable, therefore, to provide a technology that trips in the event of dangerously high residual currents, but reduces the unnecessary disconnection of electrical consumers.

SUMMARY OF THE INVENTION

A first aspect relates to a residual current protective device for an electric circuit with at least one electrical consumer. The residual current protective device comprises a residual current determination component, a leakage current determination component and an interruption component. The residual current determination component is configured to determine an amperage difference between the amperage of a current flowing to the at least one electrical consumer and the amperage of a current flowing away from the at least one electrical consumer. The leakage current determination component is configured to determine the amperage of a leakage current flowing out of the electric circuit to earth. The interruption component is configured to interrupt the electric circuit if the difference between the amperage difference determined and the amperage of the leakage current determined exceeds a preset limit value.

The term "leakage current," wherein the term "stray current" can be used with the same meaning, can be understood to mean an electric current that flows in an undesirable current path under normal operating conditions. Filter capacitors connected to the protective earth conductor can be cited as a possible cause of this. The term residual current can be understood, on the other hand, to mean an electric current caused by an insulation fault, such as too low an insulation resistance, or by an appliance fault. Thus under normal conditions, an electric current flowing in an undesirable current path can be termed a leakage current/stray current. An electric current caused by an insulation fault or an appliance fault (appliance fault of the electrical consumer) can be termed a residual current.

A current can thus be described as a stray current if it flows substantially via current paths not belonging to the operating circuit normally to the earthing or equipotential bonding system or to a protective earth conductor of an electrical system. Current paths that do not belong to the operating circuit can be deliberately provided current paths, for example, or undesirably occurring current paths. A capacitive filter at inputs and/or outputs of the connected electrical consumers (equipment), such as, e.g., EMC filters, can be cited as an example of a deliberately provided current path. In many spheres, such as, e.g., on board aircraft, electrical appliances are often installed with a very high density, so that high-frequency interferences can affect neighboring appliances in spite of the short distances between the appliances. Electrical fault currents can be discharged to the aircraft earth with the help of said filters. Examples that can be cited of undesirably occurring current paths are parasitic leakage capacitances of cables and lines or parasitic leakage capacitances in connected electrical equipment.

The preset limit value can be understood as a set operating current/trip current of the residual current protective device. The terminology "difference between the amperage difference determined and the amperage of the leakage current determined" is to be understood as the difference between the determined amperage difference and the determined amperage of the leakage current. It can thus also be said that the amperage determined for the leakage current is deducted from the determined amperage difference.

Exceeding can be understood in this case to mean that the difference between the amperage difference determined and the amperage of the leakage current determined corresponds to the preset limit value (is equal to the limit value) or exceeds the preset limit value (is greater than the limit value).

Conventional residual current protective devices only take account of the difference between current flowing to and away to determine the residual current. However, this difference can result not only from potentially hazardous residual currents, but also from leakage currents (stray currents). Known residual current protective devices trip in some cases, therefore, in the case of residual currents that lie below the limit value (this limit value is often termed rated fault current in the case of residual current protective devices). The residual current protective device according to the first aspect considers an interruption in the circuit not purely from the difference of current flowing to and away. It determines one or more leakage currents flowing out of the circuit with the aid of the leakage current determination component. By taking such leakage currents into account, the residual current protective device according to the first aspect can determine the residual current actually occurring with greater accuracy than known residual current protective devices. Thus, although the residual current protective device according to the first aspect trips if potentially hazardous residual currents arise, it at least trips less frequently if leakage currents contribute significantly to the fact that the difference determined from current flowing to and away exceeds the rated fault current.

In other words, the residual current protective device according to the first aspect uses a different reference quantity than known residual current protective devices. While known residual current protective devices use an amperage of zero as reference quantity, the residual current protective device according to the first aspect uses the determined amperage of the leakage current as reference quantity.

The residual current determination component can be configured to determine the amperage difference on expiry of a predetermined time delay. The duration of the time delay can be between a few milliseconds and several seconds depending on the type of electrical consumer. Due to the time delay it is avoided that, on account of an increased inrush current, the situation arises that the interruption component erroneously determines that the limit value has been exceeded. The electrical current that flows immediately following the switching on of an electrical consumer is normally described as the inrush current. It often differs from the rated current flowing later and can be a multiple of the rated current.

The leakage current determination component can be part of the residual current determination component. Alternatively, the leakage current determination component can be formed as a component separate from the residual current determination component.

The leakage current determination component can be configured to derive the amperage of the leakage current from at least one measurement carried out. For example, the leakage current determination component can be configured to carry out the at least one measurement in a predetermined time span. The leakage current determination component can be configured to derive the amperage of the leakage current from the at least one measurement carried out, if one or more measured values resulting from the at least one measurement lie in a predetermined tolerance range. A range of a few milliamperes, e.g., 6 mA or 10 mA, can be considered as tolerance range, but other ranges are also conceivable. The at least one measurement can be carried out, for example, if the system is in a steady state. The steady state, which can also be described as a static state, can occur after a different time span depending on the system. Purely by way of example, let a numerical value of is be specified here, so that the first of the at least one measurement can be carried out, e.g., is after the system is switched on. The time span to the static state can be determined in a known manner Furthermore, let it be said purely by way of example that several measurements, e.g., three measurements, can be carried out and the mean value of the measuring results obtained can be used as a final value for the amperage of the leakage current. Each of the at least one measurement can be carried out for a predetermined and/or adjustable time span. Purely by way of example, let a time span of 1 s per measurement be specified here.

The leakage current determination component can be configured to determine the amperage of the leakage current on initial commissioning of an electrical consumer or of the related circuit that the residual current protective device is used to monitor. The determined amperage of the leakage current can be stored following determination, for example. For example, the determined amperage of the leakage current can be stored in place of a value of 0 A as a new reference quantity. It is also conceivable that the amperage of the leakage current is determined not only on initial commissioning but in the case of a new switch-on process (power-on process) of the electrical consumer or of the related electric circuit. In this case also the determined amperage can be stored, for example, as a new reference quantity (for the enquiry as to whether a disconnection of the electric circuit is to take place).

The residual current determination component can be configured to determine the amperage difference continuously. A secure disconnection of the electric circuit can be guaranteed by this.

The electric circuit can be supplied by a three-phase system. The interruption component can be configured to interrupt at least one phase of the three-phase system. Alternatively, it is conceivable that the interruption component disconnects all poles of the circuit. The interruption component can be configured to disconnect one or more phases optionally. The residual current protective device can be dimensioned in such a way that the preset limit value (rated fault current) is at a value from 10 mA to 30 mA, e.g., at 10 mA or at 30 mA.

A second aspect relates to an electric circuit comprising at least one electrical consumer and at least one residual current protective device such as has been/is described herein. The electric circuit can comprise a filter, e.g., a network filter, connected to the input and/or output of the at least one electrical consumer. The leakage current can flow out of the electric circuit to earth via the filter.

A third aspect relates to an aircraft element or an aircraft assembly comprising at least one residual current protective device such as has been/is described herein and/or at least one electric circuit such as has been/is described herein. The aircraft element or the aircraft assembly can comprise any element or any plurality of elements of an aircraft, in which an electric circuit is present or which are connected to an electric circuit.

The aircraft element or the aircraft assembly can comprise a passenger seat, an aircraft on-board kitchen (often termed a galley), a fuel pump/pump in the tank of an aircraft (often termed fuel pump) or an aircraft toilet (often termed lavatory) or can be formed as a passenger seat, an aircraft on-board kitchen, a fuel pump/pump in the tank of an aircraft or an aircraft toilet. Other aircraft elements or aircraft assemblies are also conceivable, however, for the use of the residual current protective device. The tripping current value (limit value) of the residual current protective device can be coordinated respectively to the specific application in the aircraft element or aircraft assembly. For example, the tripping current value for the application in the passenger seat, an aircraft on-board kitchen or an aircraft toilet can be a suitable value for personal protection of, e.g., 6 mA, 10 mA or 30 mA. For the application in fuel pumps, the tripping current value can be a suitable value for fire protection of, e.g., 300 mA or 500 mA. In the case of various appliances or machines of an aircraft, the tripping current value can be at a value suitable for machine protection of, e.g., 500 mA, 1 A or more than 1 A.

A fourth aspect relates to an aircraft comprising at least one residual current protective device such as has been/is described herein and/or at least one electric circuit such as has been/is described herein and/or at least one aircraft element or aircraft assembly such as has been/is described herein.

A fifth aspect relates to the use of a residual current protective device such as has been/is described herein for an electric circuit present on board an aircraft with at least one electrical consumer.

A sixth aspect relates to a method for residual current protection for an electric circuit with at least one electrical consumer. The method comprises: determining an amperage difference between the amperage of a current flowing to the at least one electrical consumer and the amperage of a current flowing from the at least one electrical consumer; determining the amperage of a leakage current flowing out of the electric circuit to earth; and interrupting the electric circuit if the difference between the determined amperage difference and the determined amperage of the leakage current exceeds a preset limit value.

Even if some of the aspects described above were described in relation to the residual current protective device, these aspects can also be realized in a corresponding manner in the electric circuit, the aircraft element or the aircraft assembly, the aircraft, in the use of the residual current protective device or in the related method. In just the same way, the aspects described above in relation to a method can also be realized in a corresponding manner in the residual current protective device, the electric circuit, the aircraft element or the aircraft assembly, the aircraft and in the use of the residual current protective device by suitable components.

BRIEF DESCRIPTION OF THE DRAWINGS

The present disclosure is to be explained further with reference to the following schematic figures.

DETAILED DESCRIPTION OF THE PREFERRED EMBODIMENTS

In the following, without being limited to these, specific details are described in order to provide a complete understanding of the present disclosure. It is clear to a person skilled in the art, however, that the present disclosure can be used in other embodiments, which can deviate from the details set out below. For example, the present disclosure is always described below in reference to single-phase low-voltage networks. The disclosure is not restricted to this, however. The principles described herein are likewise applicable to multiphase low-voltage networks. Even if only one residual current protective device for one electric circuit with one electrical consumer is always described below, the principles described below are likewise applicable to a plurality of residual current protective devices for an electric circuit with several electrical consumers or for a plurality of electric circuits each with one or more electrical consumers.

The enclosed figures serve only for purposes of clarifying embodiments. They are not true to scale and are only intended to reflect the general concept of the disclosure by way of example. For example, features that are contained in the figures should by no means be considered a necessary constituent.

Figure 1:
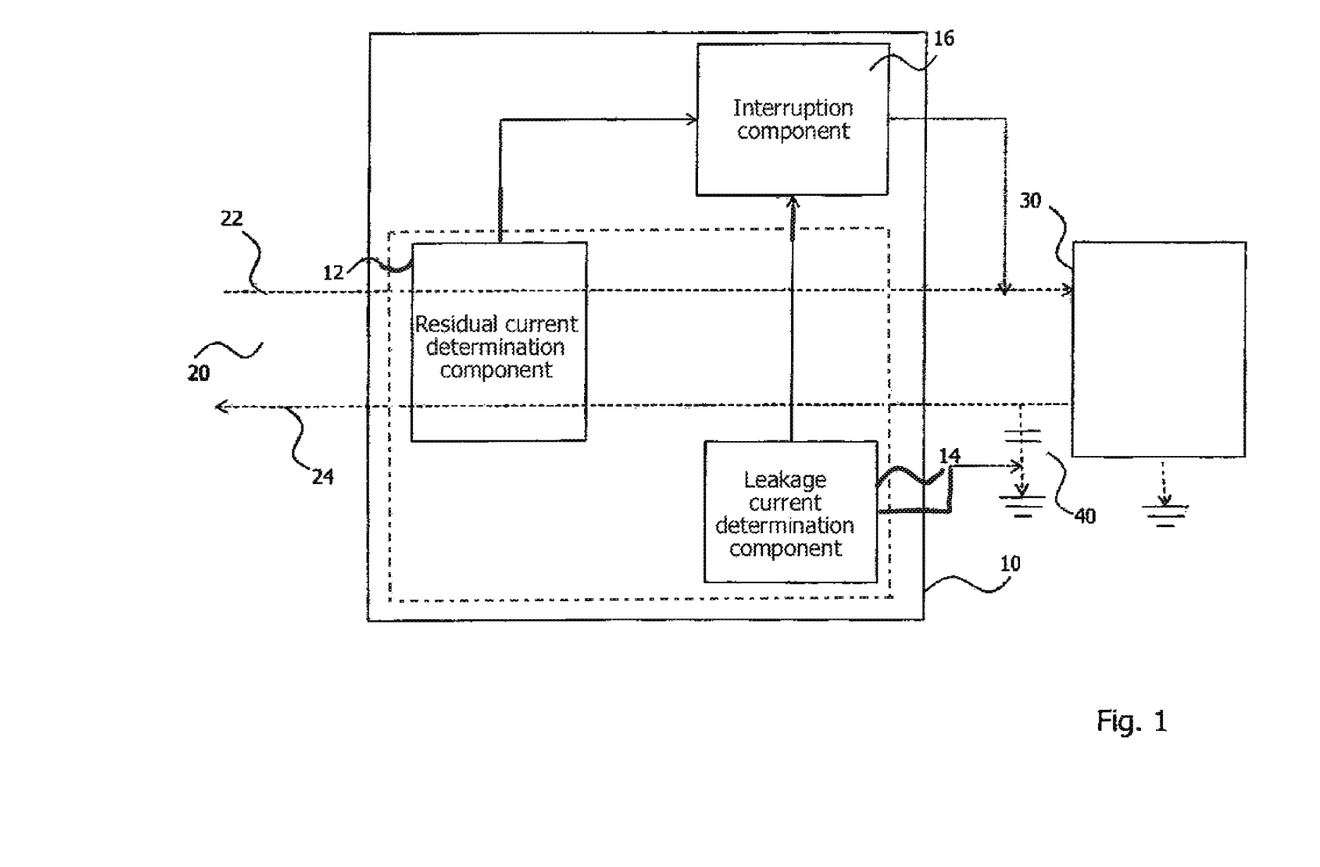
FIG. 1 is a schematic representation of an embodiment of a residual current protective device, which is connected to an electrical consumer.

FIG. 1 shows a block diagram of a residual current protective device 10 according to an embodiment. The residual current protective device 10 comprises a residual current determination component 12, a leakage current determination component 14 and an interruption component 16. As indicated by the dotted box around the residual current determination component 12 and the leakage current determination component 14, the residual current determination component 12 and the leakage current determination component 14 according to a first alternative can be arranged in one and the same unit. According to a second alternative, the residual current determination component 12 and the leakage current determination component 14 can be arranged separate from one another. The mode of functioning of the residual current determination component 12 and the leakage current determination component 14 is the same, however, in both alternatives. Furthermore, two conductors 22, 24 of an electric circuit 20 of a low-voltage network are shown as an example in FIG. 1. Low-voltage networks are usually a part of the power grid for the distribution of electrical energy to the majority of electrical consumers, which consist of low-voltage appliances. As shown by way of example in FIG. 1, the conductor 22 is an external conductor (which will be described below accordingly also as external conductor 22) and the conductor 24 is a neutral conductor (which will be described below accordingly also as neutral conductor 24). The term external conductor is usually understood as a conductor that is live in normal operation and is able to contribute to the transmission or distribution of electrical energy, but is not a neutral conductor or a middle conductor. In a single-phase connection with a rated voltage of 230 V, for example, such as is shown in FIG. 1, it only occurs once. In three-phase connections there are three external conductors. Purely by way of example, let it be said at this point that in German household power networks the root-mean-square value of the voltage of external conductors is normally 230 V to the neutral conductor or the protective earth conductor and 400 V between two external conductors. The term neutral conductor is usually understood in a low-voltage network to mean a conductor that is connected electrically to the neutral point (e.g., ground/earth) and is able to contribute to the distribution of electrical energy. The neutral conductor is usually regarded as an active conductor, since like the external conductor it is provided to carry current in regular operation. In a three-phase alternating current network, the current in the neutral conductor is cancelled out if currents of the same amperage, same phase angle and without a harmonic component flow in all three external conductors. An earthed electrical consumer 30 is also shown in FIG. 1. This can be any low-voltage consumer.

As can be seen in FIG. 1, the neutral conductor 24 is connected to earth via a network filter 40, i.e., it is earthed. In the example from FIG. 1, an input filter is shown as an example of a network filter 40. An input filter 40 of this kind is often used in electric circuits for filtering out high-frequency interference signals, i.e., to smooth the electric current. On account of the capacitive coupling of the input filter 40 to earth, high-frequency interference signals flow to earth. A smoothing of the current on the current-carrying conductors 22, 24 is achieved by this. The network filter 40 cleans the current in the electric circuit 20, so to speak, of modulated high-frequency signals, for example. The network filter can be used where these high-frequency signals are not desired, e.g., because these signals affect other consumers negatively. The high-frequency interference signals of various appliances have a low propagation, because the voltage drop for high frequencies on lines such as copper lines is relatively high. Network filters are advisable, however, if electrical consumers lie close to one another, i.e., in the case of circuits with a high density of electrical consumers. This is the case on board aircraft, for example, to name just one application example.

As to be seen in FIG. 1, the residual current determination component 12 is in contact with the two conductors 22, 24. Furthermore, the leakage current determination component 14 is in contact with the network filter 40. The interruption component 16 is in contact in turn with the electric circuit 20, as is illustrated purely schematically in FIG. 1 by the arrow from the interruption component 16 to the external conductor 22.

The electric circuit 20 can be any electric circuit of a low-voltage network. The electric circuit 30 can be an electric circuit present in a building. The electric circuit can alternatively be an electric circuit present in a means of transport, e.g., a motor vehicle, a ship, a train or an aircraft. With reference to aircraft, the electric circuit 30 can be an electric circuit of a passenger seat, an aircraft on-board kitchen (often termed galley), a fuel pump (often termed fuel pump) or an aircraft toilet (often termed lavatory). The application instances are not limited to these, however, so that the electric circuit can be any electric circuit of an aircraft, for example, in which protection by a residual current protective device is sensible for personal protection and/or fire safety and/or machinery protection.

For example, the residual current determination component 12 is configured to determine the amperage difference following expiry of a predetermined time delay.

For example, the leakage current determination component 14 is configured to derive the amperage of the leakage current from at least one measurement carried out.

For example, the leakage current determination component 14 is configured to derive the amperage of the leakage current from the at least one measurement carried out, if one or more of the measured values resulting from the at least one measurement lie in a predetermined tolerance range.

For example, the electric circuit 20 is supplied by a three-phase system and the interruption component 16 is configured to interrupt at least one phase of the three-phase system.

For example, the electric circuit 20 is located in an aircraft element or aircraft assembly.

For example, the aircraft element or the aircraft assembly comprises a passenger seat, an aircraft on-board kitchen, a fuel pump or an aircraft toilet or is configured as a passenger seat, an aircraft on-board kitchen, a fuel pump or an aircraft toilet.

For example, the aircraft element or aircraft assembly is located in an aircraft.

For example, said residual current protective device is located in an electric circuit 20 having at least one electrical consumer 30 present on board an aircraft.

Figure 2:
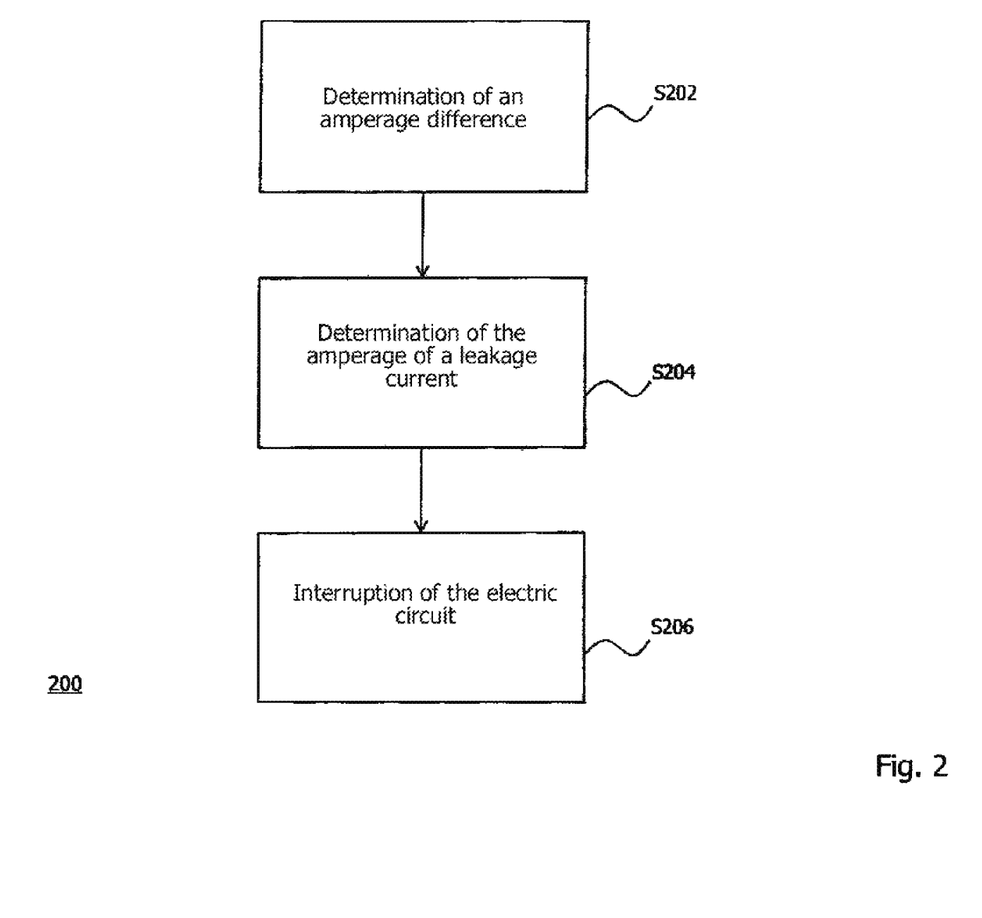
FIG. 2 is a flow chart of an embodiment of a method for residual current protection, which can be executed in the residual current protective device from FIG. 1.

The operation of the residual current protective device 10 is first explained generally with reference to FIG. 2. The residual current determination component 12 is configured to determine an amperage difference between the amperage of a current flowing to the at least one electrical consumer 30 (the current on the external conductor 22) and the amperage of a current flowing away from the at least one electrical consumer (the current on the neutral conductor 24). The leakage current determination component 14 is configured to determine the amperage of a leakage current (the current via the filter 40 to earth) flowing out of the electric circuit to earth. The interruption component 16 is configured to interrupt the electric circuit 20 if the difference between the amperage difference determined and the amperage of the leakage current determined exceeds a preset limit value. In this case the residual current protective device 10 assumes that a potentially hazardous residual current flows to earth, as will be described in greater detail below. This residual current can be a current, for example, which flows from the electrical consumer 30 to earth.

Figure 3:
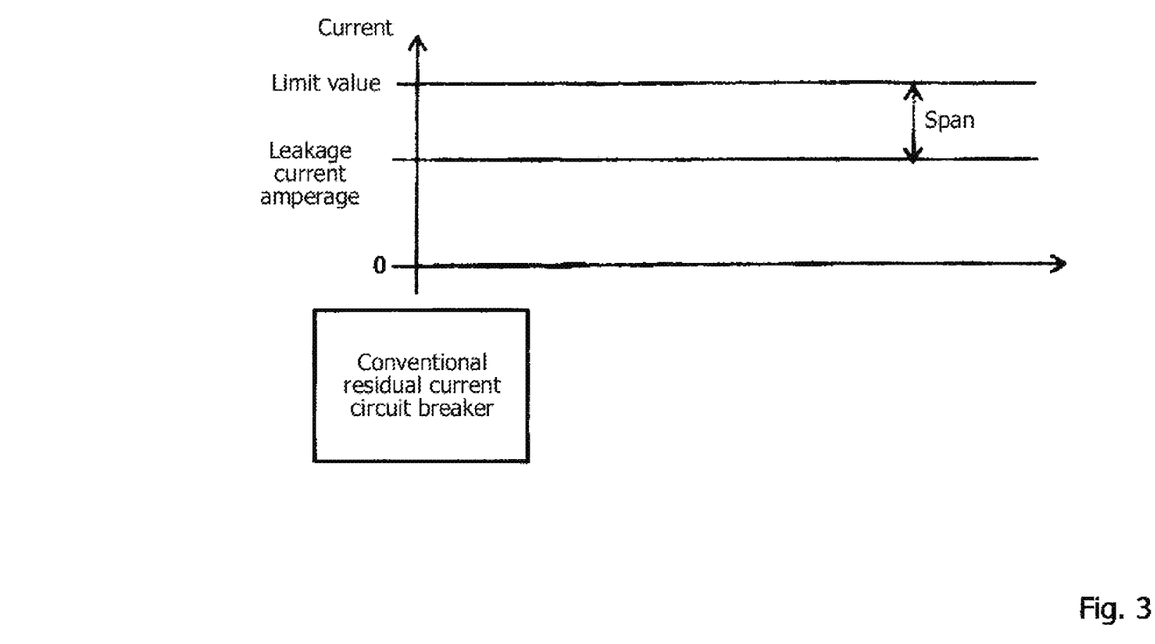
FIG. 3 is a result of the operation of a convention residual current protective device in the event of a fault.

To clarify the advantageous mode of operation of the residual current protective device from FIG. 1, the operation of a conventional residual current circuit breaker in the event of a fault is to be described first with reference to the diagram from FIG. 3. It is assumed purely by way of example that the conventional residual current circuit breaker is interconnected in the electric circuit 20 from FIG. 1 and connected to the electrical consumer 30 in place of the residual current protective device 10.

If a certain residual current (described as limit value in FIG. 3) is exceeded, the residual current circuit breaker disconnects all poles of the monitored circuit, meaning all conductors up (except for) to the protective earth conductor, from the rest of the network. Residual currents can occur if a (residual) current flows through the human body, for instance, or via defective insulation. To this end the residual current circuit breaker compares the level of the current flowing out with the return current flow. The sign-dependent sum of all currents flowing through the residual current circuit breaker must be zero in an intact system. Expressed another way, the current to the consumer 30 (the current in the external conductor 22) must be precisely as great as the current that flows back from the consumer 30 (the current in the neutral conductor 24). The comparison is made, e.g., in a summation current transformer. This has two or more cable cores (primary windings) running through it. They are routed so that their induction effect is normally reciprocally cancelled out, no magnetic flux is induced in the transformer core and no secondary current flows. The transformer thus "adds" all currents flowing to and from the consumer with sign. If a partial current flows to earth from one core (residual current), the sum of the currents flowing out and back is no longer zero in the transformer. This results in a current in the secondary winding (trip coil). The secondary current triggers a relay (switching lock), which disconnects all poles of the line.

If the residual current circuit breaker detects a residual current lying above the limit value, therefore, it disconnects the circuit. In this case the conventional residual current circuit breaker does not take into account whether the residual current results at least partially from a leakage current, such as flows, e.g., in FIG. 1 via the capacitor of the network filter 40 to earth.

It is now assumed by way of example that a potentially hazardous residual current of 20 mA, for example, is actually present. It is also assumed that an undetected leakage current of 6 mA is present. In this case the residual current circuit breaker detects a current difference between external conductor 22 and neutral conductor 24 amounting to 26 mA, i.e., a residual current of 26 mA. If it is assumed purely by way of example that the limit value of the residual current circuit breaker is 10 mA, then the residual current circuit breaker recognizes that the residual current (26 mA) exceeds the limit value (10 mA) and disconnects the circuit 20. In the case of a dangerously high residual current, the conventional residual current circuit breaker thus trips reliably.

It is now assumed by way of example that a residual current of 5 mA, for example, is present, at which no medically harmful effects on the human body are normally to be expected. It is also assumed that an undetected leakage current of 6 mA is present. In this case the residual current circuit breaker detects a current difference between external conductor 22 and neutral conductor 24 amounting to 11 mA, i.e., a residual current of 11 mA. If it is assumed purely by way of example that the limit value of the residual current circuit breaker is 10 mA, then the residual current circuit breaker recognizes that the residual current (11 mA) exceeds the limit value (10 mA) and disconnects the circuit 20, although no dangerously high residual current is present. The electrical consumer 30 was disconnected unnecessarily and can no longer be used. In this case a residual current of just 5 mA causes the residual current circuit breaker to trip. This leads in some cases to tripping of the residual current circuit breaker in situations in which no dangerously high residual current exists. In such cases the residual current circuit breaker unnecessarily disconnects one or more electrical consumers from the power supply. This (these) electrical consumer(s) are then not available, although they may be required.

Figure 4A:
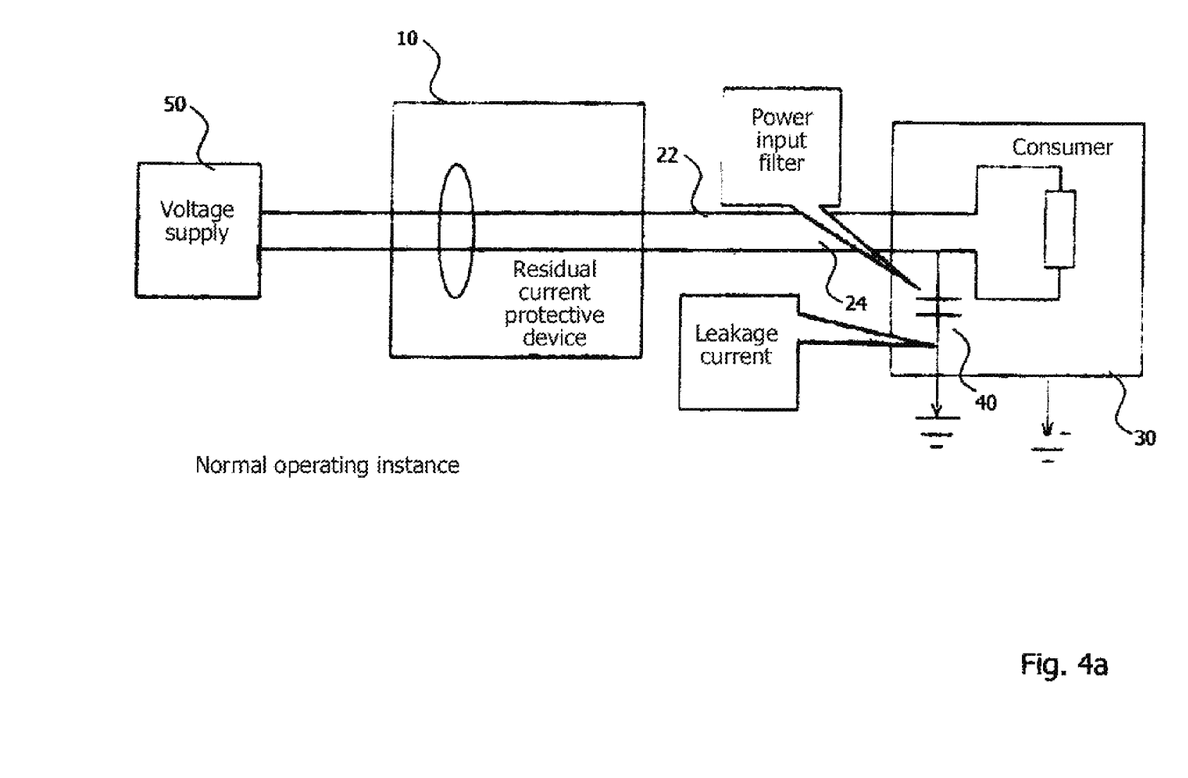
FIG. 4a is the residual current protective device from FIG. 1 in a normal operating instance.

FIG. 4a illustrates schematically the residual current protective device from FIG. 1 in a normal operating case. The voltage supply 50 provides an electric voltage, on the basis of which an electric current flows via the external conductor 22 to the electrical consumer 30 and via the neutral conductor 24 back to the voltage supply. Due to the network filter 40 present, a leakage current flows to earth. This current divider leads to less current flowing back through the residual current protective device 10 via the neutral conductor 24 than flowed via the external conductor 22 to the electrical consumer 30. During a predetermined time span following switching on of the electrical consumer and the resultant closing of the circuit 20, the leakage current determination component 14 carries out measurements, in order to determine the strength of the leakage current from these. This time span can be one or more milliseconds or even in the range of is or several seconds. It is assumed purely by way of example below that the leakage determination component 14 determines an amperage of the leakage current amounting to 6 mA. The leakage current determination component 14 can determine the amperage of the leakage current once on commissioning, for example, and store it once. Alternatively, the leakage current determination component 14 can first store the amperage of the leakage current on commissioning, then update the stored amperage of the leakage current each time the electrical consumer 30 is switched on. The mode of functioning of the residual current protective device 10 is the same in both cases, however.

Figure 4B:
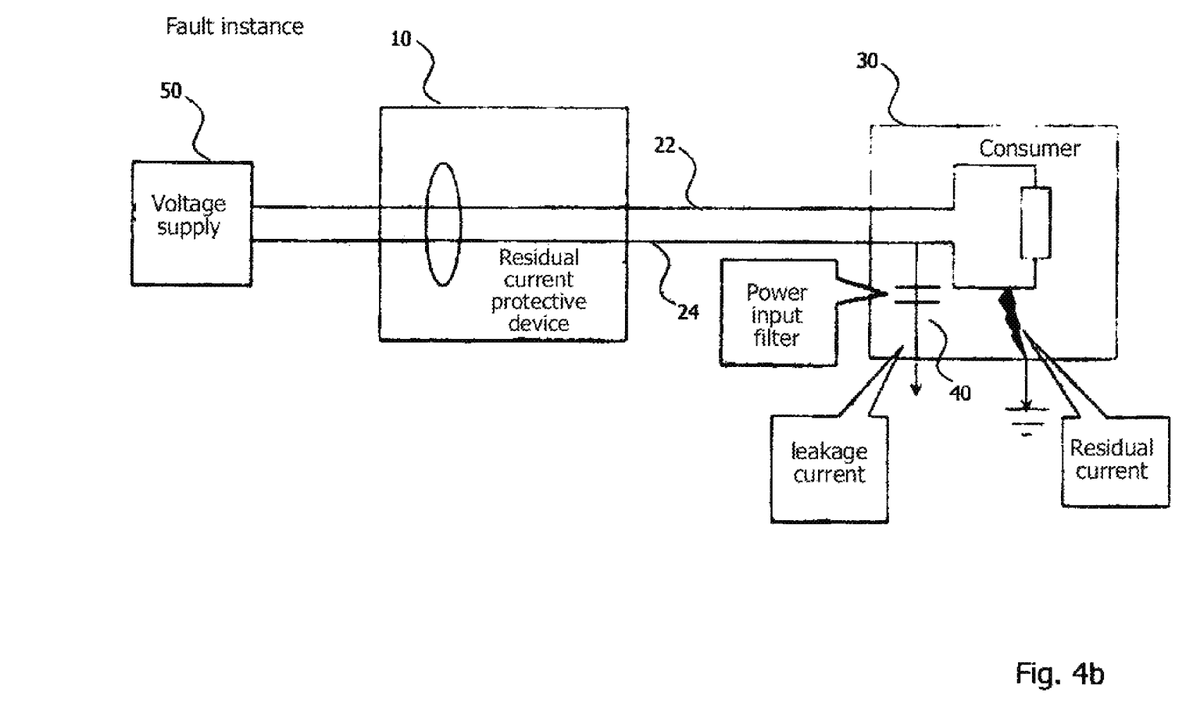
FIG. 4b is the residual current protective device from FIG. 1 in the event of a fault.
Figure 5:
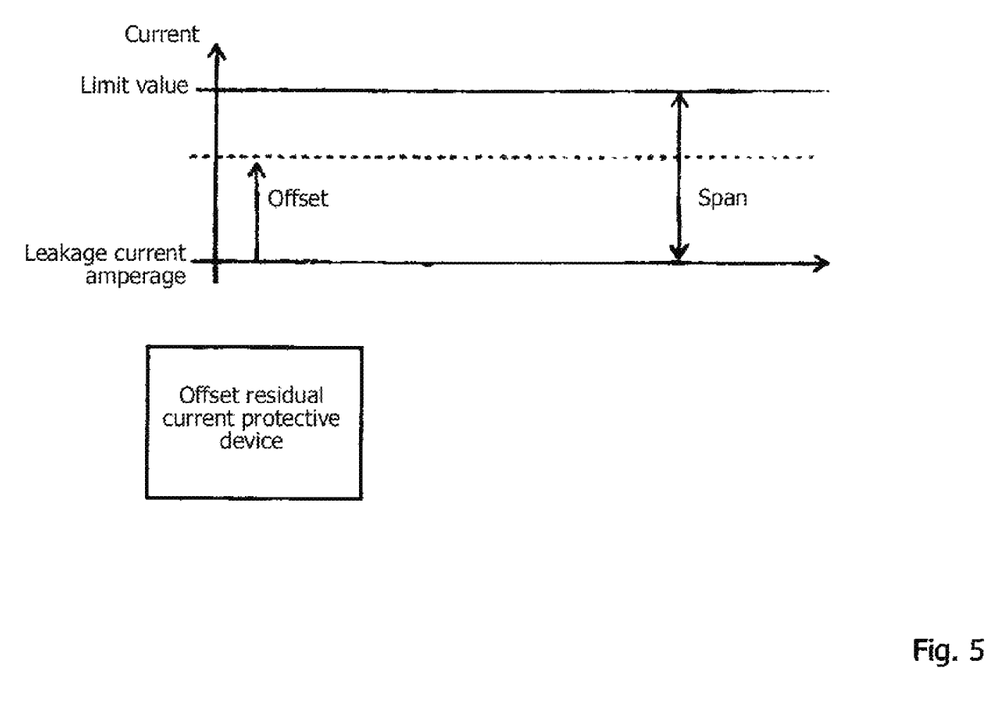
FIG. 5 is a result of the operation of the residual current protective device from FIG. 4b in the event of a fault.

The interruption component 16 accordingly sets the determined value of the amperage of the leakage current (6 mA) as a new reference quantity for subsequent calculations in place of an amperage of "0 A." This is illustrated in FIG. 5 in that the leakage amperage lies at the starting point of the y axis in place of the value "0." In contrast to the coordinate system from FIG. 3, the y axis is thus displaced by the amount of the leakage amperage determined (6 mA). This is exemplified by the term "Offset" in FIG. 5. This can also be understood in the sense that in the residual current protective device 10, the determined amperage of the leakage current is deducted from the amperage of subsequently determined residual currents, as is described below with reference to FIG. 4b.

As illustrated in FIG. 4b by the lightning bolt to earth, a residual current to earth can occur. It is assumed by way of example that a potentially hazardous residual current of 20 mA, for example, actually exists. As outlined above, a leakage current of 6 mA is determined by the leakage current determination component 14. In this case the residual current determination component 12 detects an amperage difference between external conductor 22 and neutral conductor 24 amounting to 26 mA. This means that the residual current determination component detects a residual current of 26 mA. The interruption component now relates this residual current to the leakage current determined with an amperage of 6 mA, i.e., the interruption component 16 deducts the amperage of the leakage current from the residual current and in this way determines the actual residual current amounting to 20 mA. If it is assumed purely by way of example that the limit value is 10 mA, the interruption component 16 recognizes that the residual current (20 mA) exceeds the limit value (10 mA) and disconnects the circuit 20. In the case of a dangerously high residual current, the residual current protective device 10 thus likewise trips reliably like the convention residual current circuit breaker.

It is now assumed by way of example that a residual current of 5 mA, for example, is present, at which no medically harmful effects on the human body are normally to be expected. It is also assumed that a leakage current of 6 mA is determined by the leakage current determination component 14. In this case the residual current determination component 12 detects an amperage difference between external conductor 22 and neutral conductor 24 amounting to 11 mA. This means that the residual current determination component 12 detects a residual current of 11 mA. The interruption component 16 now relates this residual current to the leakage current determined with an amperage of 6 mA, i.e., the interruption component 16 deducts the amperage of the leakage current of 6 mA from the residual current (11 mA) and in this way determines the actual residual current amounting to 5 mA. If it is assumed purely by way of example that the limit value is 10 mA, the interruption component 16 recognizes that the residual current (5 mA) does not exceed the limit value (10 mA). Thus the residual current protective device 10 does not disconnect the circuit 20. The electrical consumer remains capable of use.

An unnecessary disconnection of electrical consumers is at least reduced by this. At the same time, it is guaranteed that an electric circuit is actually disconnected in the event of dangerously high residual currents.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A residual current protective device for an electric circuit having at least one electrical consumer, comprising:
    a residual current determination component configured to determine an amperage difference between an amperage of a current flowing to the at least one electrical consumer and an amperage of a current flowing from the at least one electrical consumer;
    a leakage current determination component configured to determine an amperage of a leakage current flowing out of the electric circuit to earth; and
    an interruption component configured to store the determined amperage of the leakage, to set a preset limit value based on the determined amperage of the leakage, and to interrupt the electric circuit if the determined amperage difference exceeds the preset limit value; and
    wherein said residual current protective device is located in the electrical circuit including the at least one electrical consumer, and wherein the residual current determination component and the leakage current determination component are arranged in one and the same unit.

2. The residual current protective device according to claim 1, wherein the residual current determination component is configured to determine the amperage difference following expiry of a predetermined time delay.

3. The residual current protective device according to claim 1, wherein the leakage current determination component is configured to derive the amperage of the leakage current from at least one measurement carried out.

4. The residual current protective device according to claim 3, wherein the leakage current determination component is configured to carry out the at least one measurement in a predetermined time span.

5. The residual current protective device according to claim 3, wherein the leakage current determination component is configured to derive the amperage of the leakage current from the at least one measurement carried out, if one or more of the measured values resulting from the at least one measurement lie in a predetermined tolerance range.

6. The residual current protective device according to claim 1, wherein the electric circuit is supplied by a three-phase system and the interruption component is configured to interrupt at least one phase of the three-phase system.

7. The residual current protective device according to claim 1, wherein the residual current protective device is dimensioned such that the preset limit value is at a value of 6 mA to 1 A.

8. The residual current protective device according to claim 1, wherein the electric circuit comprises a filter connected to at least one of the input or output of the at least one electrical consumer, wherein the leakage current flows out of the electric circuit to earth via the filter.

9. The residual current protective device according to claim 1, wherein the electric circuit is located in an aircraft element or aircraft assembly.

10. The residual current protective device according to claim 9, wherein the aircraft element or the aircraft assembly comprises a passenger seat, an aircraft on-board kitchen, a fuel pump or an aircraft toilet or is configured as a passenger seat, an aircraft on-board kitchen, a fuel pump or an aircraft toilet.

11. The residual current protective device according to claim 9, wherein the aircraft element or aircraft assembly is located in an aircraft.

12. The residual current protective device according to claim 9, wherein said residual current protective device is located in an electric circuit having at least one electrical consumer present on board an aircraft.

13. A method for residual current protection for an electric circuit having at least one electrical consumer, comprising:
    determining an amperage difference between the amperage of a current flowing to the at least one electrical consumer and the amperage of a current flowing from the at least one electrical consumer;
    determining the amperage of a leakage current flowing out of the electric circuit to earth;
    storing the determined amperage of the leakage and setting a preset limit value based on the determined amperage of the leakage;
    interrupting the electric circuit if the difference between the determined amperage difference exceeds the preset limit value; and
    wherein said residual current protection is implemented in the electrical circuit including the at least one electrical consumer, and wherein the steps of determining the amperage difference and determining the amperage of the leakage current are performed in one and the same unit.

* * * * *